United States Patent [19]

Wheeler

[11] 4,391,044
[45] Jul. 5, 1983

[54] METROLOGY INSTRUMENT FOR MEASURING VERTICAL PROFILES OF INTEGRATED CIRCUITS AND THE LIKE

[75] Inventor: William R. Wheeler, Saratoga, Calif.

[73] Assignee: Tencor Instruments, Mountain View, Calif.

[21] Appl. No.: 305,986

[22] Filed: Sep. 28, 1981

[51] Int. Cl.³ .............................................. G01B 7/28
[52] U.S. Cl. ................................. 33/174 P; 33/1 M; 33/149 J
[58] Field of Search ................. 33/174 P, 1 M, 1 AA, 33/149 R, 149 J, 158, 169 R, 174 L

[56] References Cited

U.S. PATENT DOCUMENTS

| | | | |
|---|---|---|---|
| 2,622,371 | 12/1952 | Zuidierhoek | 33/174 P |
| 3,182,399 | 5/1965 | Price | 33/1 M |
| 3,561,125 | 2/1971 | Zeidler | 33/174 L |
| 3,639,993 | 2/1972 | Sartorio | 33/174 P |
| 3,718,049 | 2/1973 | Hanft | 33/174 P |
| 3,774,312 | 11/1973 | Esch | 33/174 L |
| 4,103,542 | 8/1978 | Wheeler et al. | 75/105 |

*Primary Examiner*—Willis Little
*Attorney, Agent, or Firm*—Thomas Schneck

[57] ABSTRACT

A surface profile measuring instrument, which has a stylus supported on a linear elongated beam for linear scanning. The beam is supported by a mounting mechanism which compensates for tilt by means of a servo. The stylus is pushed and pulled along the beam for linear scans of desired length.

7 Claims, 8 Drawing Figures

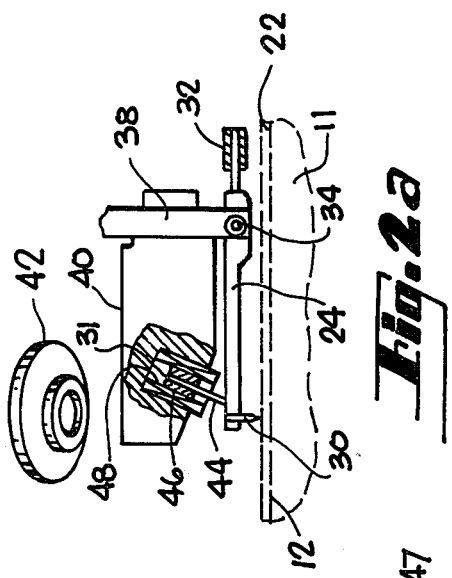
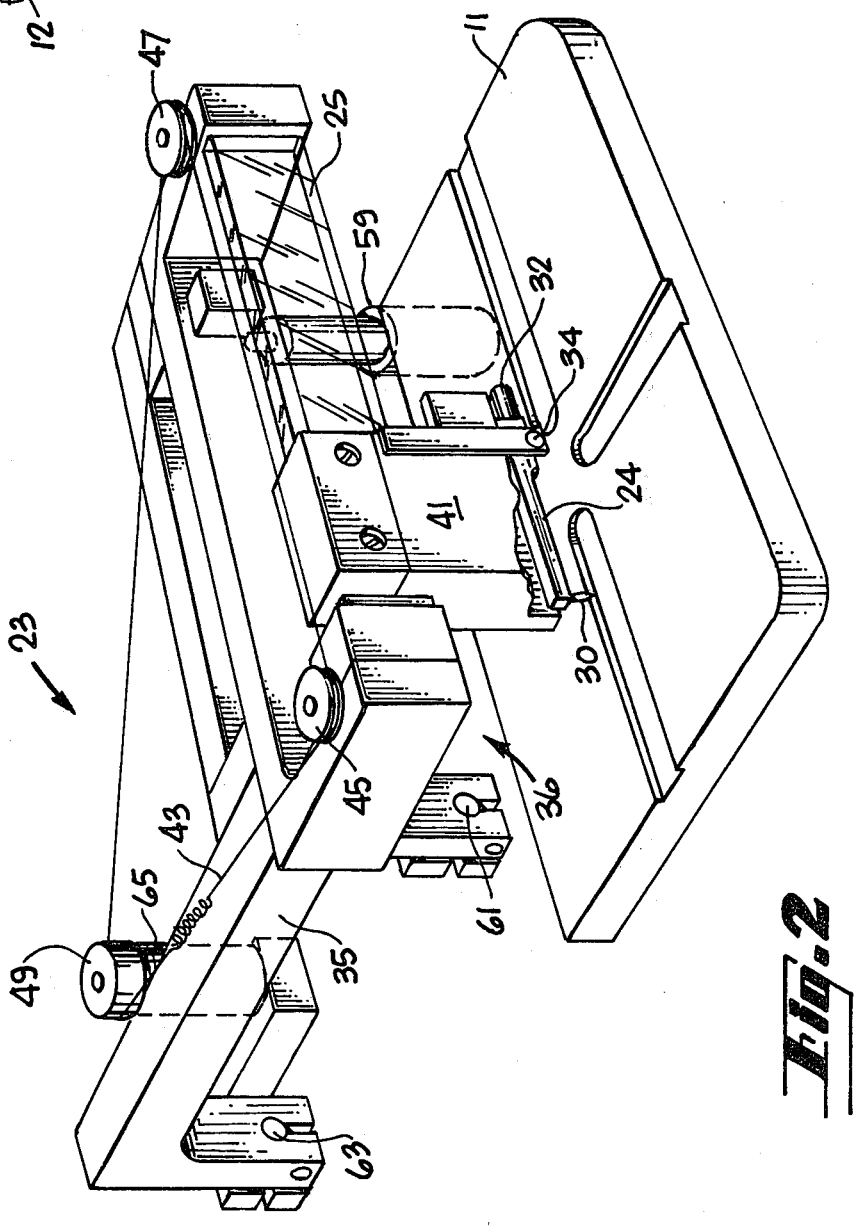

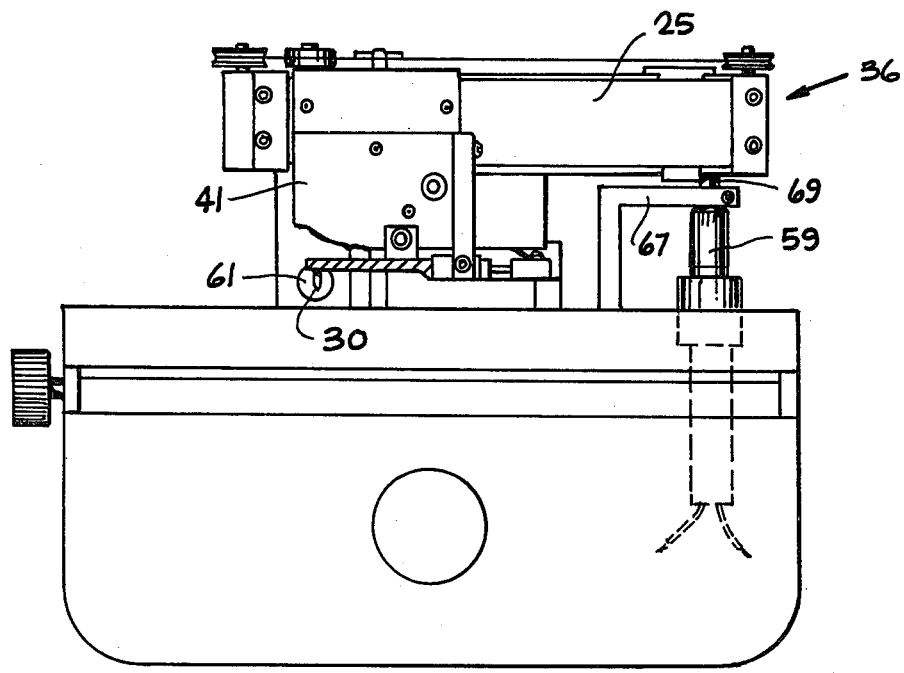
Fig. 3
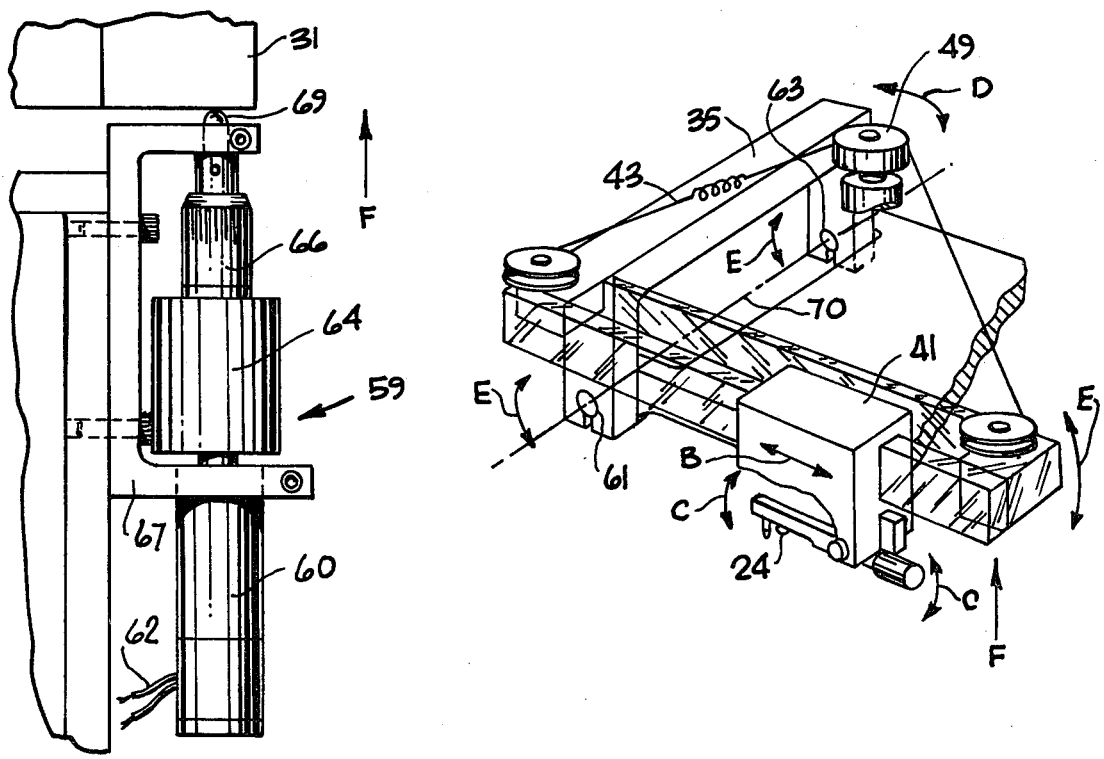
Fig. 4
Fig. 5

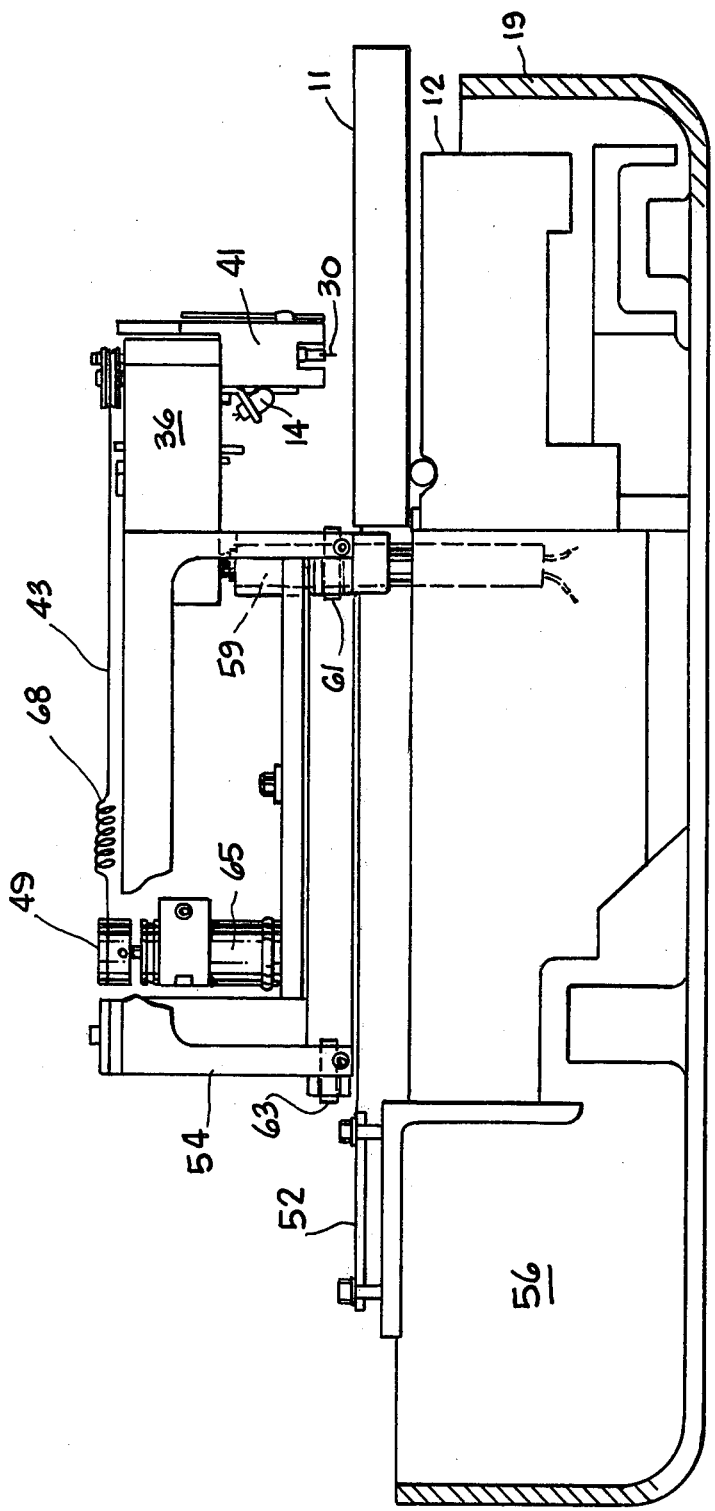

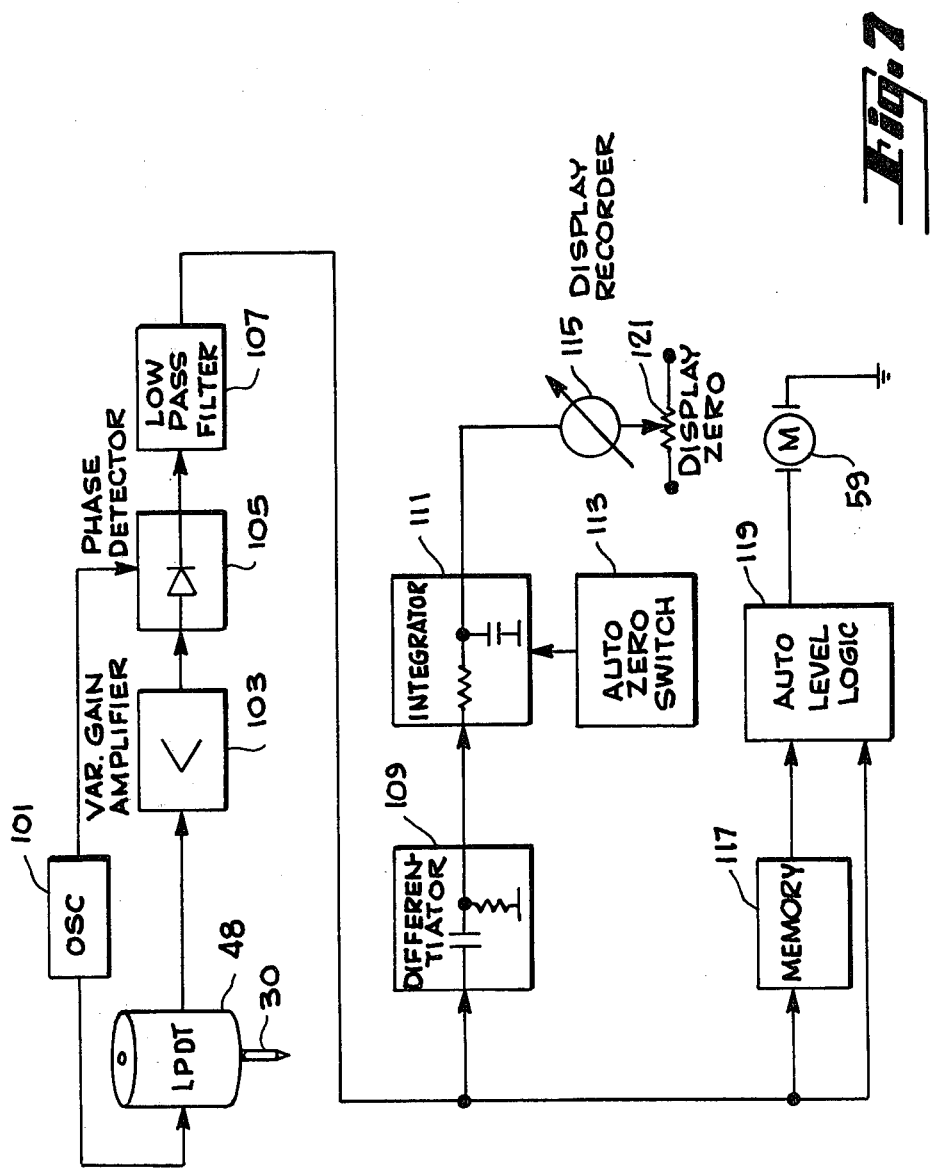

METROLOGY INSTRUMENT FOR MEASURING VERTICAL PROFILES OF INTEGRATED CIRCUITS AND THE LIKE

DESCRIPTION

1. Technical Field

The invention relates to metrology instruments for measuring surface profiles of generally flat articles and more particularly, to a surface profile measuring instrument for scanning articles having steps of various heights, such as planar integrated or hybrid circuits.

2. Background Art

In the manufacture of semiconductor integrated circuits, it is common to deposit circuit structures on planar substrates, such that the circuit, when magnified, appears as a series of mesas of various heights rising above a plain. The performance of semiconductor integrated circuits relies, to an extent, on the dimensions of the substrate and the materials deposited thereon. It is customary to measure these dimensions in the circuit manufacturing process and to adjust variables to achieve desired integrated circuit dimensions. Of special interest are the vertical dimensions of these structures which cannot readily be measured by optical or scanning electron microscopes.

In many instances, the vertical dimensions in semiconductor integrated circuits are only a few hundred to few thousand angstroms. This requires a magnification of one thousand to one million times for measurement, while horizontal magnifications of only fifty to a few hundred times are required.

Surface profile measuring instruments measure such vertical dimensions by sensing them with a stylus which generates an electrical signal corresponding to the vertical profile taken along a line. A stylus of a prior are recording surface profile measuring instrument is typically attached to a shank and this shank is connected to the moving slug of a linear position differential transformer. The stylus, the shank and the slug must be suspended to allow motion of the stylus perpendicular to the scanned surface as it scans said surface.

Instruments of the prior art use springs to suspend the mass of the stylus and slug. A problem with this type of suspension is that vibrations transmitted to the instrument from a base, e.g. a table on which the surface profile measuring instrument is standing cause the spring-suspended stylus assembly to swing and oscillate. These swings and oscillations are then reflected in the output signal as noise. Prior art instruments need to be placed on blocks of granite or on shock-insulation tables.

A problem of the prior art, related to the disparity between the vertical and the horizontal magnifications, is that as a stylus scans the surface to be measured, any incline in this surface is grossly exaggerated on the output display of the surface profile measuring instrument. Thus, to display a measured step in such a manner as to obtain a horizontal recording of its bottom and its top, the table holding the substrate must be accurately mechanically levelled, i.e., made parallel to the stylus scan, before a measuring scan is performed. To obtain an output record with the line representing the flat plane of a planar substrate having a slope less than 5%, the substrate table has to be levelled better than the ratio of vertical-to-horizontal magnification, typically less than 0.0005% slope. Such levelling, when done manually, is extremely time consuming. To manually level better than the example cited is not practically possible.

Another problem related to scale is that of the measurement falling off scale. If, say, an 800 angstrom mesa or step is to be measured on a 1,000 angstrom scale, the substrate carrying such a step has to be mechanically so positioned with respect to the measuring device, that the bottom of the step falls to within the first 200 angstroms of the scale. If this requirement is not satisfied, a part of the step will fall outside the scale of the instrument, thus making measurement impossible. To position an object mechanically with such accuracy is very difficult.

In prior U.S. Pat. No. 4,103,542 to W. R. Wheeler, et al., assigned to the assignee of the present invention, a tilt compensated stylus scanner assembly is disclosed having a gimbal mounting for the stylus, a tilt compensation circuit for automatic levelling and an automatic zeroing circuit for a readout device. The present invention is similar in some respects to this prior patent. However, the prior patent is characterized by a non-linear scanning trajectory because scanning occurs over very limited distances associated with integrated circuits. For these integrated circuits, the large radius arc made by the scanner arm appears to be almost linear and is acceptable for step height measurement. However, in other applications, such as scanning of wafers, which typically have dimensions on the order of a few inches, it is desirable to have a linear scanning trajectory.

An object of the invention has been to devise a surface profile measuring instrument having a linear scanning trajectory.

DISCLOSURE OF INVENTION

The above object has been achieved in a tilt compensated stylus scanner assembly which features a linear elongated beam suspending a counterbalanced stylus for linear scanning. The beam is itself suspended in a U-shaped pivoted bracket, with the pivots permitting tilt compensation of the beam. The bracket supports one end of the beam, while a linear incremental motor supports the other end of the beam for transmitting force to the bracket, causing the bracket to pivot and offset tilt. The stylus is pushed and pulled along the beam by a belt, driven by a motor remote from the beam. The length of the beam is selected so that a linear scan of a desired length may be achieved by the stylus.

BRIEF DESCRIPTION OF DRAWINGS

FIG. 2 is a perspective plan view of the scanner assembly in the metrology instrument of the present invention.

FIG. 2a is a partial cutaway frontal view of the stylus arm in the scanner assembly of FIG. 2.

FIG. 3 is a front view of the instrument shown in FIG. 1, without the upper cover.

FIG. 4 is a side detail view of a linear incremental motor for applying force offsetting tilt.

FIG. 5 is a simplified plan view of the scanner assembly illustrated in FIG. 2, showing rotational motions of members within the assembly.

FIG. 6 is a side view of the instrument of FIG. 1, without the upper cover.

FIG. 7 is an electrical plan for the instrument of FIG. 1.

BEST MODE FOR CARRYING OUT THE INVENTION

Figure 1:
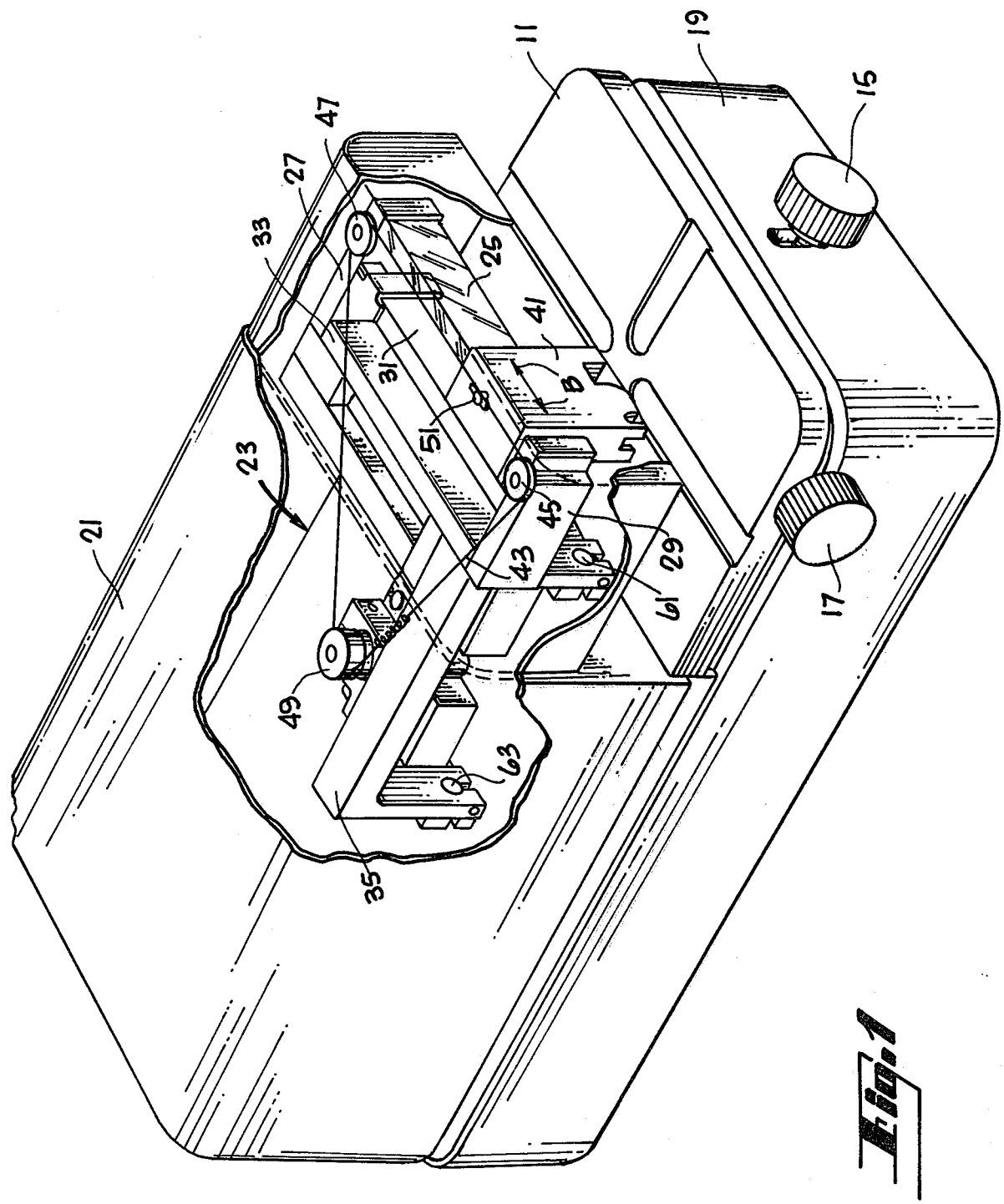
FIG. 1 is a cutaway perspective view of the metrology instrument of the present invention.

With reference to FIG. 1, the metrology instrument of the present invention is seen to comprise a movable table 11 which supports generally flat articles, such as semiconductor wafers in the central area 13. Table 11 is supported by a fixed base 19, having adjustment knobs 15 and 17 which are used for positioning table 11. Above base 19 is a shroud 21 which covers the scanner assembly 23, as well as electronics circuit boards which are behind the scanner assembly, as well as in base 19.

Scanner assembly 23 features an elongated beam 25, made of a material having a relatively low coefficient of thermal expansion, such as glass, quartz or Invar. Beam 25 is suspended over central area 13 of table 11 and extends in a straight line, a distance greater than the diameter of a flat article to be scanned. Typically such articles are three or five-inch silicon wafers used in semiconductor integrated circuit manufacturing. Thus, a preferred dimension for beam 25 would exceed five inches. Beam 25 is suspended in place by a frame having opposed sides 27 and 29. These sides, together with the first cross piece 31 and second cross piece 33 form a frame which is connected to a pivoted bracket 35. The first cross piece 31 is parallel and adjacent to beam 25. This cross piece mounts a pair of optical switches at opposite ends of the cross piece for a purpose more clearly described with reference to FIG. 7, below. Pivots 61 and 63 for bracket 35 will be described below.

A housing 41 has a slot therethrough, slightly larger in cross section than the cross section of beam 25, such that the housing is able to slide back and forth in the direction indicated by the arrows B, along beam 25. Housing 41 carries a balanced stylus, aligned to scan a generally flat specimen supported on table 11 in the central area 13. This stylus lightly contacts the specimen and generates an electrical signal indicative of step heights, as described below.

Housing 41 is driven by a belt 43 trained around the first pulley 45, the second pulley 47 and a remotely located pulley 49. A motor supplies bidirectional power to remote pulley 49, depending on the direction in which the housing 41 is to be moved. The belt 43 is secured to housing 41 at a pin 51 on top of the housing.

With reference to FIG. 2, the scanner assembly 23 may be seen more clearly. For the first time, the stylus arm 24 may be seen within housing 41. On one side of the stylus arm is a stylus 30, facing table 11, while on the opposite end is a counterbalance weight 32, balancing the stylus about a pivot 34. The stylus arm 24 and the stylus 30 are pulled across a flat article to be scanned by housing 41 to which pivot 34 is connected. Frame 36 which supports beam 25 is connected to bracket 35 on one side, the left side in FIG. 2. The frame is elevated above table 11 in a manner such that the stylus can come into contact with an article on table 11. The opposite end of the frame has one of the cross pieces supported by a linear incremental motor 59 which has an elongated shape extending upward from the instrument base. Motor 59 drives a micrometer screw through a clutch, which allows the screw vertical motion, in order to provide the tilt motion to beam 25. Since bracket 35 is pivoted, and the bracket supports the opposite end of frame 36, frame 36 can be caused to tilt about the pivots of bracket 35. The forward pivot 61 is seen to be below and slightly to the rear of the left side of frame 36, while the second pivot 63 is directly behind, but spaced apart from the first pivot 61. The pivots are such that any tilt in a flat article may be compensated by providing parallel tilt in beam 25. Using this method, the stylus 30 will see true step heights, as opposed to slopes which sometimes occur when cuts in wafers and lamella are not perfectly straight. For the first time, the motor 65, which powers remote pulley 49 may also be seen.

With reference to FIG. 2a, the details of the stylus mechanism may be seen. A flat article 22 is supported by table 11 in a position so that the stylus 30 gently contacts the article. The linear or lengthwise alignment of stylus arm 24 is maintained in a position parallel to the lengthwise slope of article 22 by a tilt compensation mechanism. Counterbalance 32 isolates stylus 30 from vibration, while the spring character of the pivot 34 provides downward force onto specimen 22. A solenoid is used to release the stylus during a scan. At other times, the solenoid forces counterbalance 32 down, picking up the stylus into a protected position. Upright arm 38 is used for slight rotational adjustments of the pivot. A set screw, at the top of the arm, makes the adjustments by pushing against a fixed member in body 40.

Stylus 30 comprises a sharpened stylus tip which is preferably diamond, although other hard substances may be used. The amount of force which the stylus point exerts on the specimen is approximately ten milligrams, which is set by the adjustment of pivot 34. The stylus tip may be supported by a holder, such as a Kovar rod extending upwardly into the stylus arm. Use of Kovar prevents motion of the stylus due to rapid temperature changes which occur when the specimen table is illuminated by an intense source, sometimes necessary for viewing through a lens, such as the microscope objective 42. The instrument of the present invention may be provided with an optional microscope, not shown, allowing optical inspection at the same time that the instrument is measuring step heights of a specimen. The stylus arm is connected to a quartz rod 44 having a slug 46 at the end thereof. The purpose of slug 46 is to form a portion of a linear position differential transformer (LPDT) which transduces motion from the stylus tip to an electrical signal representing that motion and thence to a display or recorder. When upward motion of the stylus tip occurs, a corresponding translation of slug 46 occurs within a coil 48, causing the LPDT to generate a change in the electrical signal, the change being indicative of the vertical motion of the stylus tip over the surface of a sample. Coil 48 is seen to have a slight forward tilt so that rotation of the stylus about the pivot 34 will produce essentially linear motion of the slug within the coil. The stylus motion and generation of a corresponding electrical signal is essentially the same as described in the previously mentioned U.S. Pat. No. 4,103,542.

In FIG. 3, an interesting aspect of the invention may be seen. When housing 41 is at the left-hand extreme end of beam 25 the downward end of stylus 30 coincides with the center of pivot 61. If this is considered the zero point for the start of scanning motion, tilt within a specimen to be scanned is compensated from this zero point by rotation about the zero point. Rotation is caused by a force means, namely the linear incremental motor 59 and screw which applies force to the right-hand end of frame 36, thereby providing the necessary force for offsetting specimen tilt. The linear incremental motor 59 is held by a bracket 67 so that only a movable micrometer screw 69 projects above the bracket. Typically, the amount of extension of the screw 69 is on the order of micro inches.

FIG. 4 shows the detailed view of the linear incremental motor 59, including a lower motor 60 receiving force commands along wires 62, a clutch 64 and a forward micrometer barrel 66 which supports screw 69, exerting force in the direction of arrow F. Motor 60 is connected by support bracket 67 to the instrument face, while screw 69 contacts cross piece 31, just behind beam 25.

FIG. 5 summarizes the motions of the scanner assembly. Stylus arm 24 is pivoted for motion indicated by the arrows C. This corresponds to up and down motion of the stylus tip as it rides over step heights of an article being tested. The stylus in turn is carried by housing 41 moved by belt 43 in the direction of arrows B. In turn, the belt 43 is bidirectionally driven by a motor, transferring force to remote pulley 49 which may rotate in the directions indicated by the arrows D. For the purpose of offsetting tilt, bracket 35 is pivoted to rotate about pivot 61 and 63 along the axis indicated by the dashed line 70 in the directions indicated by the arrows E.

In the side view of FIG. 6, motor 65 may be seen driving remote pulley 49, in turn driving belt 43. A spring 68 connects opposite ends of the belt, providing tension for the belt. A circuit board 52 is seen to be connected behind the scanner assembly, above an electronics compartment 56, housing circuits described in FIG. 8, below. Instrument base 19 is seen to contain a reference block 12, over which movable table 11 is supported. It is seen that housing 41 suspends stylus 30 a slight distance over table 11 and that the housing 41 is itself suspended slightly forward of frame 36. A lamp 14 provides rearward illumination of the stylus 30. The position of pivots 61 and 63 are shown to be colinear, and allowing the tilting of bracket 35, previously described, along a pivot axis which intercepts the tip of stylus 30 at the zero point.

With reference to FIG. 7, the electrical plan of the present invention may be seen. Slug 46, not shown, connected to the stylus 30 moves in the center of coil 48, which together form the LPDT. In turn, the LPDT is connected to the high frequency oscillator 101 which provides excitation of the LPDT at approximately 6.25 kHz. While this frequency is not critical, it is suitable for sensing small variations in the position of the slug, associated with the stylus. Both the oscillator 101 and the variable gain amplifier 103 which amplifies the LPDT signal, are connected to a phase detector 105. The phase detector detects a signal which is proportional to the position of the slug. The output signal from phase detector 105 is fed to an active low-pass filter 107 for eliminating any residual signals from the high frequency oscillator 101. The output from filter 107 is an electrical signal corresponding to step heights of a flat article with respect to an arbitrary reference. The electrical signal consists of a function of time plus constants where the constants are representative of d.c. signal components.

The filter output signal is fed to a differentiation circuit 109. This circuit is typically an operational amplifier which is arranged for taking the time derivatives of a time varying step height function. The output of the differentiation circuit eliminates the constants which represent d.c. signal components, leaving only the time varying step height function. The output of differentiator 109 is transmitted to integrator 111, reconstituting the original signal fed into the differentiator 109, but without d.c. signal components.

Automatic zeroing is provided by a switch 113 which discharges integrator 111 at the start of the measurement. The stylus is moved to the zero point, aligned behind the axis defined by pivot 61 and 63, and a zero is set in display 115 by adjustable resistor 121.

The output of low-pass filter 107 is also transmitted to a memory unit 117, a sample and hold circuit, which remembers the vertical starting position of the slug. The same signal is transmitted to the auto level logic gate 119. If positive or negative changes occur due to vertical changes in the position of the slug indicative of specimen tilt, the linear incremental motor 59 is operated for causing compensating tilt to the stylus by exerting force indicated by the direction of arrow F in FIG. 5.

Memory 117 operates for a time period which corresponds to a very small scanning length, such as 1.25 millimeters. At the end of the first pass, scanning is interrupted, the scanning arm is reset to its initial position and memory is loaded with a new value. During the second pass, data is again collected, allowing the LPDT and associated circuits to determine whether tilt exists. If leveled, a full scan of housing 41 across beam 25 is made. If not leveled, another attempt is made at a very low drive speed. If level is not reached, a system error is indicated. Assuming that level is reached, a step height profile is indicated by the display or recorder 115.

In this patent application, reference has been made to scanning articles such as wafers for integrated circuit manufacturing. However, the apparatus of the invention may be used for scanning other surfaces having unusual vertical profiles, such as aspheric lenses, coated surfaces, thin films and the like.

I claim:

1. A tilt compensated stylus scanner comprising,
an elongated beam suspended in a frame, the beam supporting a housing movable along the beam,
a stylus mounted on a lower portion of said housing for contact with a generally flat article to be scanned linearly in the direction of the beam,
a transducer connected to said stylus for generating an electrical signal representing a step height profile of said generally flat article,
pivoted bracket means having said frame mounted thereto for suspending said beam above the article to be scanned for tilt compensation of the beam,
force means communicating with said bracket for compensating undesired tilt of the beam,
drive motor means for moving said movable housing on the beam, and
a base supporting said bracket means.

2. A tilt compensated stylus scanner comprising,
an elongated beam suspended in a frame, the beam supporting a housing movable along the beam,
a stylus mounted on a lower portion of said housing for contact with a generally flat article to be scanned linearly in the direction of said beam,
a transducer connected to said stylus for generating an electrical signal representing a step height profile of said generally flat article,
a bracket having spaced apart extensions with aligned pivots defining an axis for tilt compensation of the beam to be scanned relative to the article to be scanned, the tilt axis being perpendicular to said elongated beam, said bracket supported from a base at said pivots and having said frame mounted thereto, force means communicating with said bracket for compensating undesired tilt of the beam, and drive motor means for moving said movable housing on the beam.

3. The scanner of claim 1 or 2 wherein said beam is made of a material having a relatively low coefficient of expansion.

4. The scanner of claim 1 or 2 wherein said beam has a length greater than two inches.

5. The scanner of claim 2 wherein said frame has opposite ends, supporting opposite ends of the beam, one frame end mounted on the bracket, the other frame end mounted atop said force means whereby the force means applies tilt compensation to the bracket through the beam.

6. The scanner of claim 1 or 2 wherein said drive motor means comprises a motor, a belt and three pulleys with the belt trained about the pulleys, including first and second pulleys on opposite sides of the beam and connected to said movable housing therebetween, and a third pulley remote from the first and second pulleys, one of the pulleys being driven by the motor.

7. The scanner of claim 2 wherein said bracket has an inverted U-shape, the bracket spaced apart extensions being legs of the U-shape, the pivots disposed near the extremities of the legs, said frame being connected to one of the legs of the bracket.

* * * * *